United States Patent [19]
Castanis

[11] 3,787,599
[45] Jan. 22, 1974

[54] EDUCATIONAL TOY FOR THE TEACHING OF NUMERICAL RECOGNITION

[75] Inventor: George Castanis, New York, N.Y.

[73] Assignee: Questor Corporation, Toledo, Ohio

[22] Filed: Feb. 7, 1973

[21] Appl. No.: 330,438

[52] U.S. Cl.............................................. 35/31 R
[51] Int. Cl. ........................................ G09b 19/02
[58] Field of Search ...... 35/31 R, 31 D, 31 F, 31 G, 35/69, 70, 71, 72, 73, 32

[56] References Cited
UNITED STATES PATENTS

| | | | |
|---|---|---|---|
| D163,085 | 5/1951 | Bishop................................ | 35/72 X |
| 2,424,538 | 7/1947 | Beder.................................. | 35/73 X |
| 2,513,596 | 7/1950 | Severson............................. | 35/70 |

FOREIGN PATENTS OR APPLICATIONS 1,392,930  2/1965  France..................................... 35/70

Primary Examiner—Wm. H. Grieb

[57] ABSTRACT

A plurality of egg-shaped articles which may be placed in a series of wells in a container. Each of the egg-shaped articles are comprised of half-sections which may be frictionally mated in a male-female manner. The inner face of one half-section includes a fixed number of holes and the inner face of the other half-section includes a like number of pegs. Each of said articles contain a different number of peg-hole combinations. A numeral indicia may be placed on the inner faces of the half-sections.

5 Claims, 2 Drawing Figures

PATENTED JAN 22 1974 3,787,599

EDUCATIONAL TOY FOR THE TEACHING OF NUMERICAL RECOGNITION

This invention relates generally to educational toys and more specifically to toys which are designed to teach very young children numerical recognition.

One of the primary things that is taught to young children, that is pre-school children, is the recognition and meaning of the basic numerals. In order to arouse the interest of the young child, many toys have been designed which fascinate the child but at the same time teach him such things as numerical identification.

It is further desirable to teach young children of this age a degree of physical dexterity. Such dexterity is primarily accomplished by means of fitting various objects into matching spaces. Such toys are numerous and have assumed various designs.

Accordingly, an object of the present invention is to teach pre-school children numerical identification by means of a toy.

A further object of this invention is to combine the teaching of numerical identification with a degree of hand dexterity achieved through manipulation of the toy.

These and other objects will become apparent in the following description taken in conjunction with the drawings wherein.

Broadly speaking, the present invention includes a plurality of egg shaped articles which may be placed in alignment in a container such as an egg carton or the like. Each of the egg shaped articles comprise a female half section and a male half section which, when mated, are frictionally held together. On the inner side of one of the half sections, there are a fixed number of holes in a face therein with the other half section having a fixed number of pegs which mate with the holes. Each of the articles have a different number of pegs and holes than each of the other articles and, preferably, the numbers progress from the number "1" in sequence to the number desired. In order to associate a numeral with the number of pegs and holes in each article, each article may have a numerical indicia on each of the faces which matches the particular number of that particular article.

Figure 1:
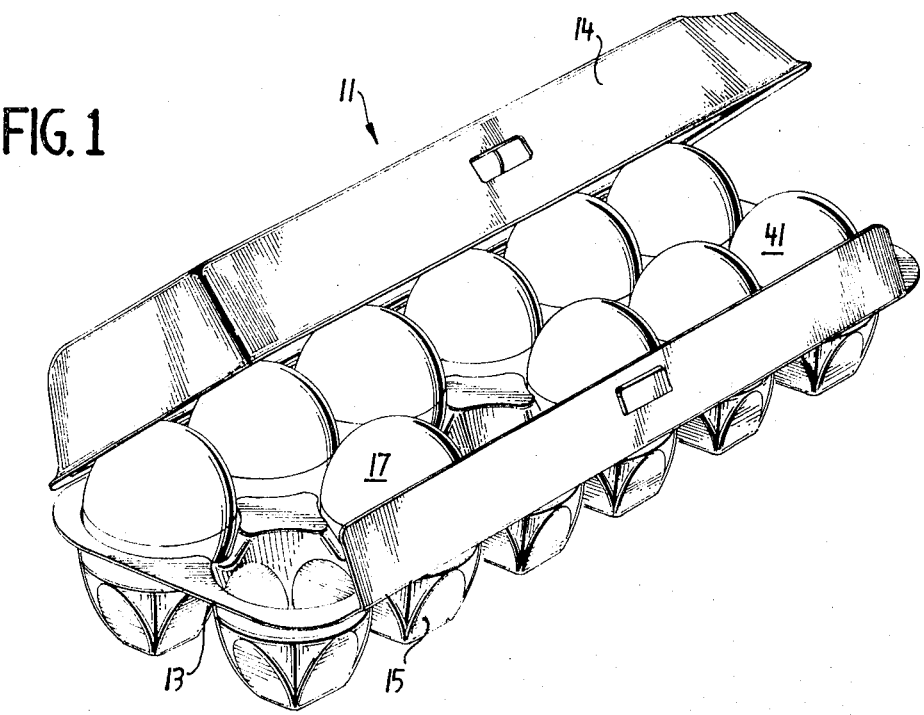
FIG. 1 is a perspective view of the toy of the present invention.

Turning now more specifically to the drawings, there is shown in FIG. 1 one preferred form of the invention indicated as a carton 11 having a lower section 13 and an upper section 14. The carton may be made of material such as a molded plastic with integral flexible hinges (not shown) so that the carton may be opened and closed in a manner similar to the well known egg carton.

The bottom section 13 has a series of wells 15 which are designed to accept the egg shaped articles such as article 17 shown in FIG. 1.

Figure 2:
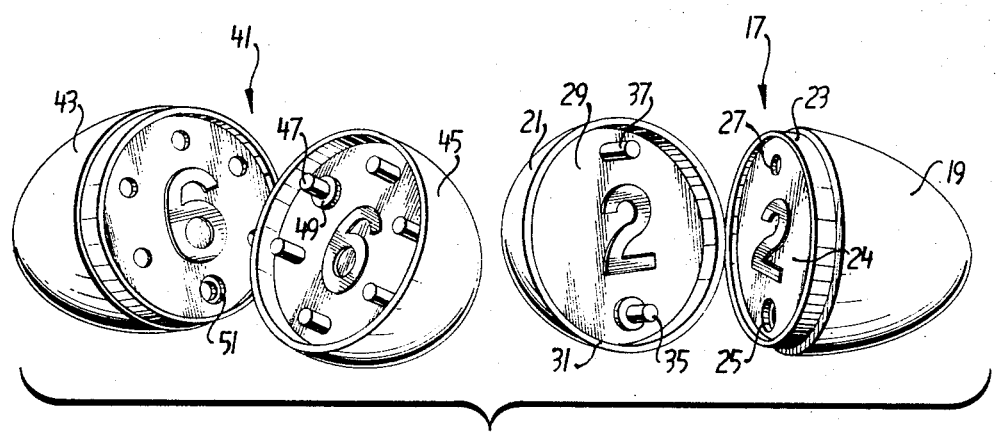
FIG. 2 is a perspective view of two of the egg shaped articles used in connection with the present invention.

In FIG. 2 there are shown two eggs to illustrate the use of the toy for educational purposes. The egg with the indicia "2" thereon is shown as comprising a male half section 19 and a female half section 21. The male half section terminates in a reduced cylindrical extension 23 and a face 24 near the outer end of the extension 23. A fixed number of holes 25 and 27 pass through the face 24 of the male section 19.

The female half section terminates in a rim 31 having a recessed face 29 therein. The rim is of a size such that the cylindrical extension 23 fits snugly therein so that when the two half sections are mated, they are held in place by frictional contact between the extension 23 and the rim 31.

The inner face of the female half section 21 has pegs 35 and 37 extending outwardly from 29. The pegs are equal in number and are positioned so as to mate with the holes 25 and 27 when the two sections are joined.

For purposes of illustration there is also shown in FIG. 2 an egg shaped article having a male half section 43 and a female half section 45. This particular egg shaped article has six holes and six pegs with the corresponding numeral indicia "6" on each face thereof.

In each instance, there is illustrated the use of a further means for providing a required identification and mating dexterity of the child. This may be accomplished by having one of the pegs terminating at its base in an enlarged cylindrical area. The female half section contains one hole having an enlarged upper opening with a smaller reduced opening comprising one of the holes. With this arrangement, the two half sections may not be mated unless the special peg is also mated with the special hole.

As can be seen, the present invention provides an educational toy which allows the child to count either the number of pegs, or the number of holes, and, if the eggs are all separated and mixed together, then the child must find the two halves which mate properly with the pegs and the holes. In so mating the havles, the child will automatically become accustomed to associating the numerical indicia on the halves with the number of either of the pegs or the holes and will mate each similar numeral together. Additionally, when the carton is used, the child can associate the order of the eggs to be placed therein by means of being taught to place egg number "1" in the one corner well and progressing up to "6" and then advancing back along the parallel row until he ends up with the egg number "12" in the other adjacent corner well.

As can be seen, the present invention provides many of the desirable features for teaching pre-school children dexterity and identification of numerals. The above description and associated drawings are illustrative only since the configurations and geometric outlines of pegs and holes could be varied without departing from the scope of the present invention. Accordingly, such scope is to be limited only by the following claims.

I claim:

1. An educational toy comprising
   a container having a plurality of wells therein,
   a plurality of egg shaped articles adapted to fit within said wells, said articles comprising
   a female half section,
   a male half section of a size to mate with said female half section,
   a fixed number of holes in one of said half sections, and,
   a fixed number of pegs in the other one of said half sections, said holes and pegs being equal in number and located so as to be in alignment when said half sections are mated, each of said articles having a different number of pegs and holes from each of said other articles.

2. The toy of claim 1 further comprising a substantially flat inner face within each of said half sections, said pegs and said holes being integral with the respective ones of said flat inner faces.

3. The toy of claim 2 further comprising a numeral indicia on each of said flat inner faces, said numeral indicating the number of pegs and holes integral with said faces.

4. The toy of claim 2 wherein one of said pegs in each of said articles has an enlarged base, and one of said holes in each of said articles has an enlarged section of a size to mate with said enlarged base of said peg.

5. An educational toy having egg shaped articles which may be placed in a container having a plurality of wells therein, each of said egg shaped articles comprising a female half section, a male half section of a size to mate with said female half section, a fixed number of holes in one of said half sections, and, a fixed number of pegs in the other one of said half sections, said holes and pegs being equal in number and located so as to be in alignment when said half sections are mated, each of said articles having a different number of pegs and holes from each of said other articles.

* * * * *